(No Model.)
T. HILL.
VEHICLE.
No. 307,546. Patented Nov. 4, 1884.
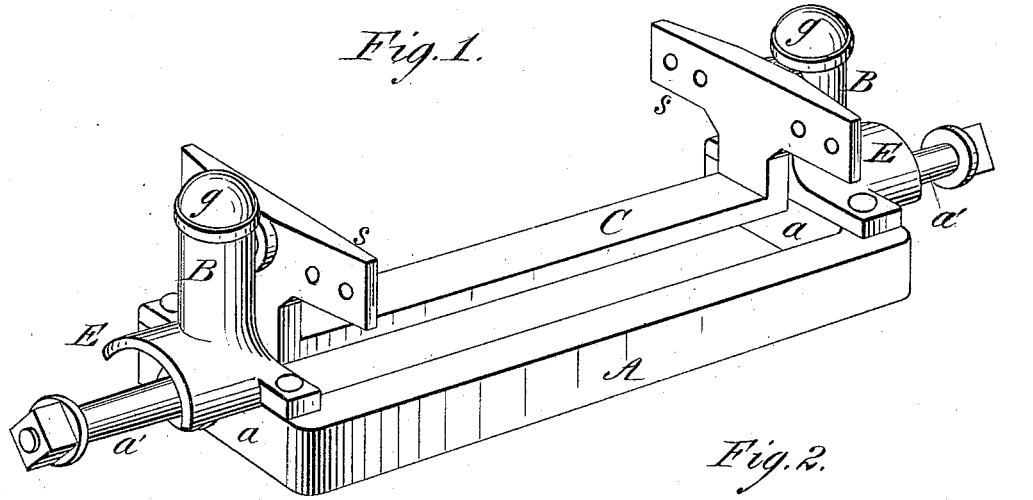
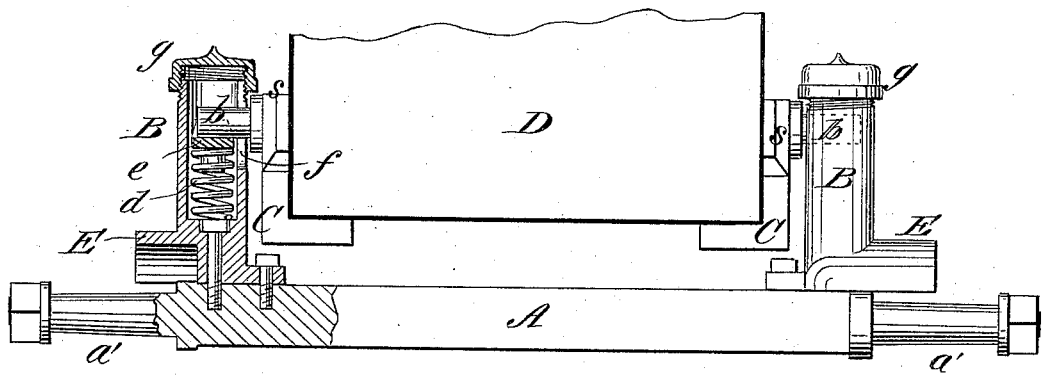
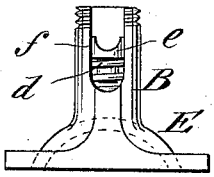
WITNESSES:
Donn Twitchell
C. Sedgwick
INVENTOR:
T. Hill
BY Munn & Co
ATTORNEYS.

UNITED STATES PATENT OFFICE.

THOMAS HILL, OF JERSEY CITY, NEW JERSEY.

VEHICLE.

SPECIFICATION forming part of Letters Patent No. 307,546, dated November 4, 1884.

Application filed February 2, 1884. (No model.)

*To all whom it may concern:*

Be it known that I, THOMAS HILL, of Jersey City, in the county of Hudson and State of New Jersey, have invented certain new and useful Improvements in Draft-Vehicles, of which the following is a full, clear, and exact description.

My invention relates to improvements in draft-vehicles; and it consists in the peculiar construction and arrangement of parts, all as hereinafter fully described, and pointed out in the claim.

Reference is to be had to the accompanying drawings, forming part of this specification, in which similar letters of reference indicate corresponding parts in all the figures.

Figure 1 represents a view in perspective of a cranked axle with my invention applied. Fig. 2 is a partly-sectional longitudinal elevation of a straight axle with invention applied; and Fig. 3, an elevation, as seen from its inner side, of one of the bearers, with inclosed spring for supporting the vehicle-body.

A is the metal axle, which may either be cranked, as at $a\ a$ in Fig. 1, or be straight and in line with its arms $a'\ a'$, upon which the wheels of the vehicle run. Upon the ends of the body of the axle are erected and secured by bolts, either as shown in Fig. 1 or as represented in Fig. 2, the bearers or boxes B B, which receive the pivots or journals $b$ at the ends of the downwardly-cranked bar C or bracket-like bar-sections C C, upon which or to cross-arms $s\ s$ thereof the body D of the vehicle is secured. These boxes B B vary somewhat in shape, accordingly as they are applied to a straight or cranked axle; but in every case the same are of a hollow and close construction, to incase or hold under cover within them the springs $d$, upon which, or upon bearings $e$ carried thereby, the pivots $b$ of the cranked bar or bar-sections C C rest, said pivots passing through a slot, $f$, in the inner side of either box. Said boxes, too, are or may be closed on their top by a screw or other cap, $g$. Thus the springs $d$, which may be of any suitable material and construction, are protected from injury or from doing injury, and by the arrangement of parts shown horizontal jerking action of the body of the vehicle is neutralized and an easy up-and-down spring movement secured. The weight, too, of the body and its load, as carried by the pivoted downwardly-cranked bar or bar-sections C C, will be equalized on the springs. In Fig. 1 this downwardly-cranked pivoted support or carrier C for the body of the vehicle is shown as made all in one piece, extending the whole width of the body of the vehicle; but it may be made in sections C C—that is, with its main central portion cut away, as shown in Fig. 2—no matter whether the axle A be a straight or a cranked one.

Projecting from either box B on its outer side is a mud or dirt shield, E, arranged to overhang and more or less cover the inner portions of the arms or journals $a'\ a'$ of the axle. These shields will serve to prevent dirt from being thrown or carried up onto said arms, and so reduce friction and wear of the arms or journals.

Having thus described my invention, what I claim as new, and desire to secure by Letters Patent, is—

In combination with the axle and boxes containing the springs by which the vehicle-body is supported, the mud-shields attached to said boxes, and arranged to overhang and partly inclose the inner end portions of the arms or journals of the axle, substantially as and for the purposes herein set forth.

THOMAS HILL.

Witnesses:
EDGAR TATE,
ALFRED H. DAVIS.